Figures 1, 3:
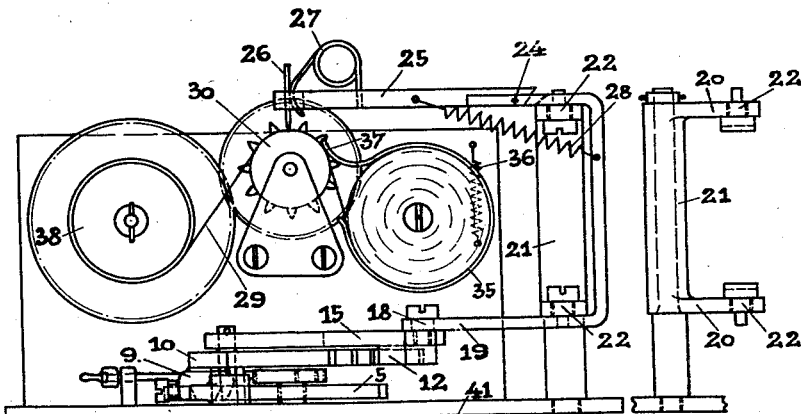

Nov. 29, 1927.

G. PEISELER 1,651,102

AUTOMATIC DEVICE FOR RECORDING THE MOVEMENTS OF MACHINES AND THE LIKE

Filed Nov. 20, 1926     2 Sheets-Sheet 1

Inventor
Gottlieb Peiseler
per
Attorney

Nov. 29, 1927.  1,651,102
G. PEISELER
AUTOMATIC DEVICE FOR RECORDING THE MOVEMENTS OF MACHINES AND THE LIKE
Filed Nov. 20, 1926    2 Sheets-Sheet 2

Inventor
Gottlieb Peiseler
her
Attorney

Patented Nov. 29, 1927.

1,651,102

UNITED STATES PATENT OFFICE.

GOTTLIEB PEISELER, OF LEIPZIG-LEUTZSCH, GERMANY.

AUTOMATIC DEVICE FOR RECORDING THE MOVEMENTS OF MACHINES AND THE LIKE.

Application filed November 20, 1926, Serial No. 149,554, and in Germany May 25, 1926.

This invention concerns improvements in automatic devices for recording, for example, the movements of machine or other parts such as parts of machine tools, manufacturing machines, conveyor devices, or the like. It relates in particular to automatic recording apparatus of the type comprising clock-work operating a paper-band and recording means of which the pencil or the like is moved at right angles to the direction of movement of the paper band.

The automatic recording device according to the present invention comprises clockwork for feeding a paper-band, a recording mechanism with a recording pencil or the like moved at right angle to the movement of the paper, and adjustable rectilinearly guided means adapted to transmit the movements to be investigated to the said pencil or the like and to cause the latter to record the same on the paper proportionally to the movements to be investigated.

One feature of the invention resides in the provision of an adjustable transposing gear, for transmitting the movements of the apparatus to be tested to the recording pen or the like. While these movements may in different cases vary within wide limits it is obviously desirable in making tests that the recording pen should execute movements commensurable with the width of the paper strip or with such part thereof as may be desired. In most cases it is advantageous for the movement of the pencil corresponding to the maximum machine-movement recorded to be somewhat less than the width of the paper band. Distinct readable diagrams may then be obtained.

The recording pencil is guided so as to execute rectilinear movements preferably by a guiding member and by mounting the pencil-actuating means in a rotatable sleeve. At the same time provision is made for the deflection being proportional to the movements by transmitting the movements between two co-operating levers through the intermediary of a special cam.

A further feature of the present invention consists in the provision of means whereby it is possible, for certain records, to record several diagrams successively on a single paper strip. So as to be able to effect this without disconnecting the recording device from the machine part or the like to be investigated an adjustable coupling and a change-gear are provided whereby it is possible to reduce the diagrams of the movements recorded to a suitable extent.

With these and other objects in view as will more fully appear, as the description proceeds, the invention consists in certain constructions, arrangements and combinations of the parts that I shall hereinafter fully describe and claim.

Figure 2:
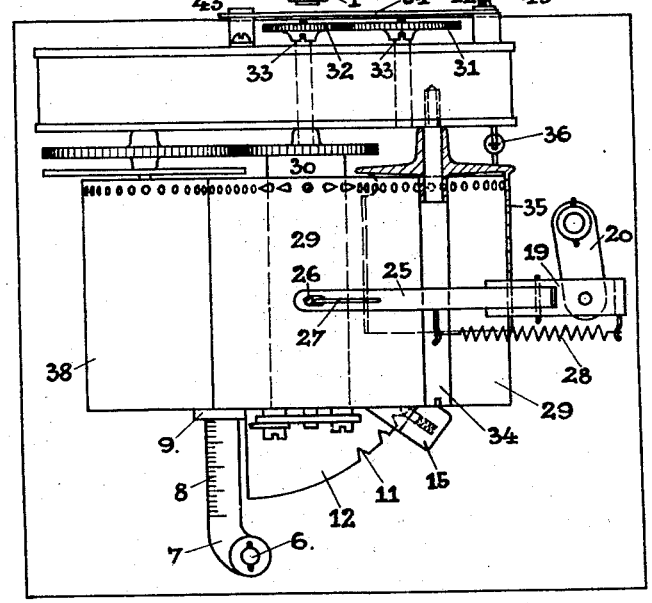
Figure 4:
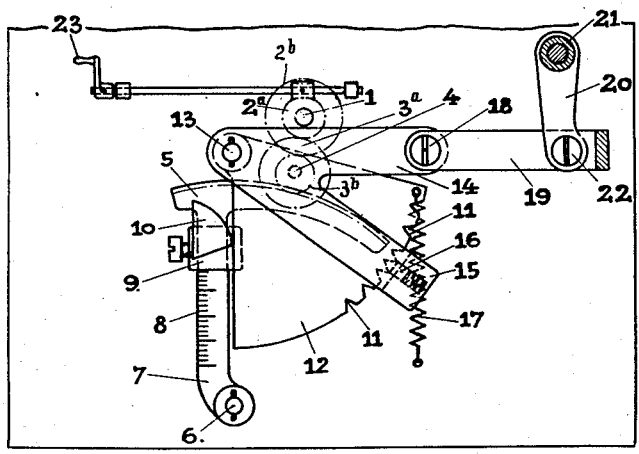
Figure 5:
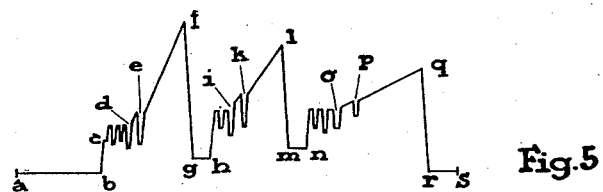
Figure 6:
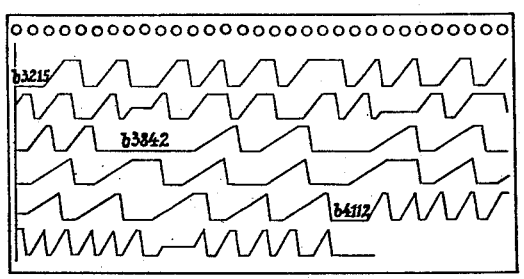

For a full understanding of the invention reference is to be had to the following description and accompanying drawings which represent by way of example an embodiment of the invention Fig. 1 is a front elevation, partially in section, of the apparatus with the cover removed, Fig. 2 is a plan, partially in section, corresponding to Fig. 1, Fig. 3 is a detail lateral elevation of the sleeve carrying the bearings for the member supporting the recording pencil, Fig. 4 is a plan view of the transmission gear and moving parts between the driving shaft and the pencil holder (the clock-work and paper-controlling means are omitted), Fig. 5 is a diagram of a drilling operation, Fig. 6 is a comparative diagram of operations on 6 week-days and

Figure 7:
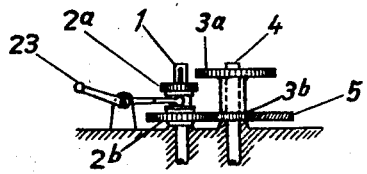

Fig. 7 is an elevational view of the change-gear device between the initial drive and the recording means.

Referring to the drawings the device consists of clock-work and recording mechanism mounted together on a plate forming a wall of a casing which is normally closed by a cover (not shown). The drive for the recording means derived from a piece of apparatus or machinery to be investigated or tested (machine-tool, conveyor-device or the like) is transmitted to a pinion-spindle 1 and from this by way of suitable change-gear wheels $2^a$, $2^b$, $3^a$, $3^b$ (Fig. 4) to a gear wheel 4 which meshes with an arcuate gear 5.

The change gear includes gear wheels $2^a$, $2^b$ mounted on the pinion spindle 1 in such a manner as to be capable of sliding together thereon although incapable of rotation relatively thereto. The gear change may be effected by means of a crank 23 and the gear may be furnished with wheels to give different gear ratios in accordance with particular requirements. It would naturally be possible to construct the change-gear device so that any number of ratios could be obtained by rotation of the crank 23.

The movements of the member to be tested are thus transmitted to the toothed arc 5, mounted on a straight arm 7, which is oscillatable about a fixed pivot 6. A slide 9 arranged so as to be adjustable along a scale 8 is mounted on the arm 7 and is provided with a cam-member 10 of which the shape is determined by the condition that a proportional transmission of the movements is to be obtained. The cam-member 10 bears on a segment 12 which is provided in its arcuate edge with indentations or notches 11 and is oscillatable about a fixed pivot 13 about which a double-armed, i. e., V-shaped lever 14, 15 is also oscillatable. A spring loaded pawl 16 which is adapted to engage with the indentations 11 and thus to couple the lever-arm 15 to the segment 12 is provided on the said arm 15. The segment 12 and, therewith the double armed lever 14, 15 are maintained in continuous operative engagement with the cam-member 10 and in consequence, in engagement with the initial drive on the pinion spindle 1 by a spring 17 attached to the segment 12. Thus all movements of the pinion spindle 1 are transmitted to the double-armed lever 14, 15.

A U-shaped lever 19 actuating the pencil is pivoted at 18 to the lever-arm 14 and is mounted in such a manner as to be capable of movement, on bearings on a sleeve-member 21 furnished with two arms 20.

A pencil-holder 25 is pivoted at 24 to the U-shaped lever, a lead 26 being held in a slot therein by a spring 27. The pencil is maintained in contact with the paper strip by a spring 28 which, in order that the pressure of the pencil on the paper shall not decrease as it wears away, is made comparatively long.

The paper-strip 29 is moved by a feed-drum 30 rotated by clockwork which drives the shaft of the said drum 30 through a gear wheel 31 and a gear wheel 32 on said shaft. The gear wheels are each prevented from rotating by a pin 33 and from being displaced axially by a lever 34. The paper strip is either in the form of a paper roll rotatably mounted on a spindle 34 or in the form of short strips. In either case it is enclosed in a lead sheath 35 which is rotatable about the spindle 34 and tends to rotate, due to a spring 36, in a counterclockwise direction until the end 37 of the said sheet bears on the paper band, presses the same securely on the feed drum 30 and thus brakes the strip of paper running thereover. The unwound end of the paper is rewound on the roll 38.

The initial drive on the pinion spindle 1 from the apparatus to be tested may be effected either by means of a cord 39 or through a positive connection such as a chain or toothed wheel. In the case of a cord drive a rim 40 which encloses the rim 41 of the grooved pulley 42 is provided on the casing. A peripheral groove 43 into which a resilient ring 44 formed at one end to provide a guide eye 45 for the cord 39 is provided in the rim 40.

The said eye may be adjusted in accordance with the direction of the cord.

If apparatus executing several individual movements is investigated then a diagram such as that shown in Fig. 5 is recorded. To utilize the full depth of the diagram the resilient pawl 16 is inserted in the middle notch on the segment 12 and the change-gear device is so adjusted that on a particular oscillatory movement of the pinion spindle 1 the U-shaped member 19 executes a suitably large deflection together with the recording pencil 26. If it is desired that a series of diagrams should be combined on a paper strip (Fig. 6) then the change-gear is adjusted in such a manner that the oscillatory movements of the pinion spindle 1 cause smaller deflections of the pencil, the resilient point 16 being brought successively into the various notches in the segment 12 so that the recording pencil executes a new diagram each time the said pawl is adjusted from notch to notch. Depending on the number of notches 11 and on the adjustment of the change-gear any desired number of diagrams may be recorded successively on a paper strip.

Fig. 5 illustrates by way of example the operation of a drilling machine, the various sections having the following significance:

$a$—$b$ setting up of work, $b$—$c$ lowering the drilling spindle on to the work, $c$—$d$ several preliminary drilling and centering operations after the hole has been indicated by an initial cut, $d$—$e$ drilling with automatic feed measurement.

$e$—$f$ drilling proper of the hole with automatic feed;

$f$—$g$ retraction of the drilling spindle, $g$—$h$ adjustment of the drill to a fresh hole and replacement of the tool, $h$—$i$ several further preliminary boring operations, $k$ measurement, $k$—$l$ automatic operation, $l$—$m$ retraction of the drilling spindle;

$m$—$n$ adjustment to a fresh hole and replacement of the tool, $n$—$o$ several preliminary boring operations, $p$ measurement, $p$—$q$ drilling proper of the hole, $q$—$r$ retraction of the drilling spindle, $r$—$s$ removal of work.

The direction of the lines $e$—$f$, $k$—$l$ and $p$—$q$ is a measure of the feed with which the drilling was effected. The horizontal lengths in the direction $a$—$b$ indicate periods of time and lengths perpendicular thereto of the movements of the drilling spindle. Thus a diagram of operations, characteristic in every respect, is obtained from which it is possible to see immediately the time taken in setting up and removing the work, the total efficiency of the operation in respect of manner and duration and also the nature of the course of operations in respect of the movements and speed thereof.

Fig. 6 shows the records taken on six days from a milling machine. The paper band was moved back each day so that all the diagrams commence from a single datum line.

Having thus fully described my invention, I claim:

1. In a recorder actuating device, an oscillatory recorder actuating lever, a gear train, an oscillatory motion transmitting lever, a gear segment carried by the motion transmitting lever, a gear for actuating said gear segment, a sector-shaped oscillatory motion transmitting element, a motion transmitting member carried by the motion transmitting lever for transmitting swinging movement in one direction to said sector-shaped motion transmitting element, said member being adjustable to vary the motion transmitted to said sector-shaped motion transmitting element on a prescribed working motion of the motion transmitting lever, a spring acting on the sector-shaped motion transmitting element for swinging it in the opposite direction, and an adjustable connection between the recorder actuating lever and the sector-shaped motion transmitting element for varying the degree of motion transmitted from the latter to the former.

2. In a recorder actuating device, an oscillatory recorder actuating lever, a gear train, an oscillatory motion transmitting lever, a gear segment carried by the motion transmitting lever, a gear for actuating said gear segment, a sector-shaped oscillatory motion transmitting element, a motion transmitting cam carried by the motion transmitting lever for transmitting swinging movement in one direction to said sector-shaped motion transmitting element, said cam being adjustable to vary the motion transmitted to said sector-shaped motion transmitting element on a prescribed working motion of the motion transmitting lever, a spring acting on the sector-shaped motion transmitting element for swinging it in the opposite direction, and an adjustable connection between the recorder actuating lever and the sector-shaped motion transmitting element for varying the degree of motion transmitted from the latter to the former.

3. In a recorder actuating device, an oscillatory recorder actuating lever, a gear train, an oscillatory motion transmitting lever, a gear segment carried by the motion transmitting lever, a gear for actuating said gear segment, a sector-shaped oscillatory motion transmitting element pivoted at its vertex and having a series of notches in its curved edge, a motion transmitting member carried by the motion transmitting lever for transmitting swinging movement in one direction to said sector-shaped motion transmitting element, said member being adjustable to vary the motion transmitted to said sector-shaped motion transmitting element on a prescribed working motion of the motion transmitting lever, a spring acting on the sector-shaped motion transmitting element for swinging it in the opposite direction, and a dog carried by the recorder actuating lever and engageable with any of the notches in the sector-shaped motion transmitting element for variably coupling said lever and elements for different degrees of motion transmitting actions from the latter to the former.

4. In a recorder actuating device, an oscillatory recorder actuating lever, a gear train, an oscillatory motion transmitting lever, a gear segment carried by the motion transmitting lever, a gear for actuating said gear segment, a sector-shaped oscillatory motion transmitting element, a motion transmitting cam carried by the motion transmitting lever for transmitting swinging movement in one direction to said sector-shaped motion transmitting element, said cam being adjustable to vary the motion transmitted to said sector-shaped motion transmitting element on a prescribed working motion of the motion transmitting lever, a spring acting on the sector-shaped motion transmitting element for swinging it in the opposite direction, and a dog carried by the recorder actuating lever and engageable with any of the notches in the sector-shaped motion transmitting element for variably coupling said lever and elements for different degrees of motion transmitting actions from the latter to the former.

In witness whereof I have hereunto set my hand.

Dr. Ing. GOTTLIEB PEISELER.